United States Patent
Li et al.

(10) Patent No.: US 9,389,095 B2
(45) Date of Patent: Jul. 12, 2016

(54) NAVIGATION SYSTEM WITH POINT OF INTEREST RANKING MECHANISM AND METHOD OF OPERATION THEREOF

(75) Inventors: Hanhong Li, Cupertino, CA (US); Hongwei Feng, Palo Alto, CA (US)

(73) Assignee: Telenav, Inc., Santa Clara, CA (US)

( * ) Notice: Subject to any disclaimer, the term of this patent is extended or adjusted under 35 U.S.C. 154(b) by 1506 days.

(21) Appl. No.: 12/730,181

(22) Filed: Mar. 23, 2010

(65) Prior Publication Data

US 2011/0238288 A1    Sep. 29, 2011

(51) Int. Cl.
*G01C 21/00* (2006.01)
*G01C 21/36* (2006.01)

(52) U.S. Cl.
CPC .................. *G01C 21/3679* (2013.01)

(58) Field of Classification Search
CPC ................. G01C 21/3679; G01C 21/3682
USPC .......................................... 701/533
See application file for complete search history.

(56) References Cited

U.S. PATENT DOCUMENTS

| | | | |
|---|---|---|---|
| 6,480,837 B1 * | 11/2002 | Dutta | |
| 6,525,768 B2 | 2/2003 | Obradovich | |
| 7,082,365 B2 | 7/2006 | Sheha et al. | |
| 7,440,875 B2 | 10/2008 | Cuthbert et al. | |
| 8,239,130 B1 * | 8/2012 | Upstill et al. | 701/426 |
| 2003/0109266 A1 * | 6/2003 | Rafiah et al. | 455/456 |
| 2005/0165543 A1 * | 7/2005 | Yokota | 701/204 |
| 2006/0287810 A1 | 12/2006 | Sadri et al. | |
| 2007/0219706 A1 | 9/2007 | Sheynblat | |
| 2008/0016055 A1 | 1/2008 | Riise et al. | |
| 2008/0234929 A1 | 9/2008 | Watson et al. | |
| 2009/0012955 A1 | 1/2009 | Chu et al. | |
| 2009/0105941 A1 | 4/2009 | Johnston et al. | |
| 2009/0187538 A1 * | 7/2009 | Grun | 707/3 |
| 2009/0265103 A1 | 10/2009 | Kostepen | |
| 2009/0307018 A1 | 12/2009 | Chappell et al. | |
| 2010/0138151 A1 * | 6/2010 | Jang et al. | 701/201 |
| 2010/0153008 A1 * | 6/2010 | Schwartz et al. | 701/207 |
| 2010/0161215 A1 * | 6/2010 | Karani | 701/204 |
| 2010/0250118 A1 * | 9/2010 | Bansal et al. | 701/204 |
| 2010/0305848 A1 * | 12/2010 | Stallman | 701/204 |
| 2011/0131243 A1 * | 6/2011 | Aben et al. | 707/771 |
| 2011/0313657 A1 * | 12/2011 | Myllymaki et al. | 701/208 |

OTHER PUBLICATIONS

International Search Report for PCT Application No. PCT/US2011/025114 dated Apr. 6, 2011.

* cited by examiner

*Primary Examiner* — Michael D Lang
(74) *Attorney, Agent, or Firm* — IP Investment Law Group

(57) ABSTRACT

A method of operation of a navigation system includes: generating a first point of interest; identifying a current location for locating a device; and calculating a dynamic rank for the first point of interest, the dynamic rank represents a relevant match listing of the first point of interest based on a proximity of the current location to the first point of interest and an encounter validity based on the arrival time at the first point of interest.

20 Claims, 10 Drawing Sheets

NAVIGATION SYSTEM WITH POINT OF INTEREST RANKING MECHANISM AND METHOD OF OPERATION THEREOF

TECHNICAL FIELD

The present invention relates generally to a navigation system, and more particularly to a navigation system for point of interest ranking.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location-based service devices, new and old usages begin to take advantage of this new device space. There are many solutions to take advantage of this new device opportunity. One existing approach is to use location information to provide navigation services, such as a global positioning service (GPS) navigation system for a mobile device.

In response to consumer demand, navigation systems are providing ever-increasing amounts of information requiring these systems to improve usability, performance, and accuracy. This information includes transaction information, map and routing data, business information, and local driving conditions. The demand for more information and the need to provide user-friendly experience, low latency, and accuracy continue to challenge the providers of navigation systems.

Navigation system and service providers are continually making improvements in order to be competitive. In navigation services, demand for better usability and functionality by providing additional information is increasingly important. Some navigation systems and services allow the creation and management of location specific information as it relates to routing and target destination selection. Connecting location with point of interest information including ranking information could enable new categories of services such as predictive destination selection and improved point of interest selection.

Thus, a need still remains for a navigation system with point of interest ranking to efficiently manage and measure the time and location sensitive information about a point of interest and to provide flexible point of interest search and selection mechanisms. Due to the growth in the use of navigation systems, it is increasingly critical that answers be found to these problems. In view of the ever-increasing competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a first point of interest; identifying a current location for locating a device; and calculating a dynamic rank for the first point of interest, the dynamic rank represents a relevant match listing of the first point of interest based on a proximity of the current location to the first point of interest and an encounter validity based on the arrival time at the first point of interest.

The present invention provides a navigation system including: a control unit for generating a first point of interest; a location unit, coupled to a control unit, for identifying a current location; and a dynamic rank module, coupled to the control unit, for calculating a dynamic rank for the first point of interest, the dynamic rank represents a relevant match listing of the first point of interest based on a proximity of the current location to the first point of interest and an encounter validity based on the arrival time at the first point of interest.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
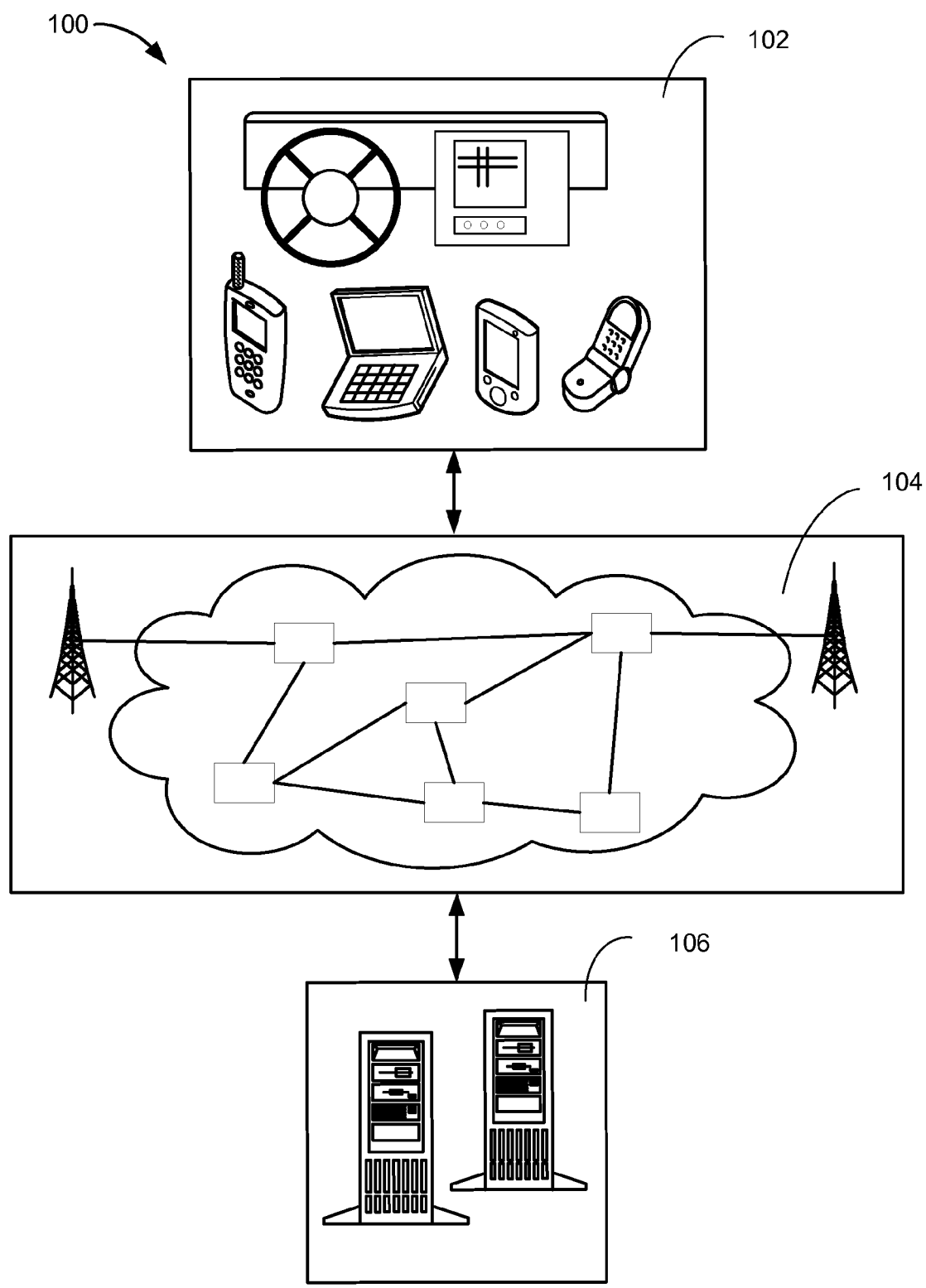
FIG. 1 is a navigation system with point of interest ranking mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with point of interest ranking mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
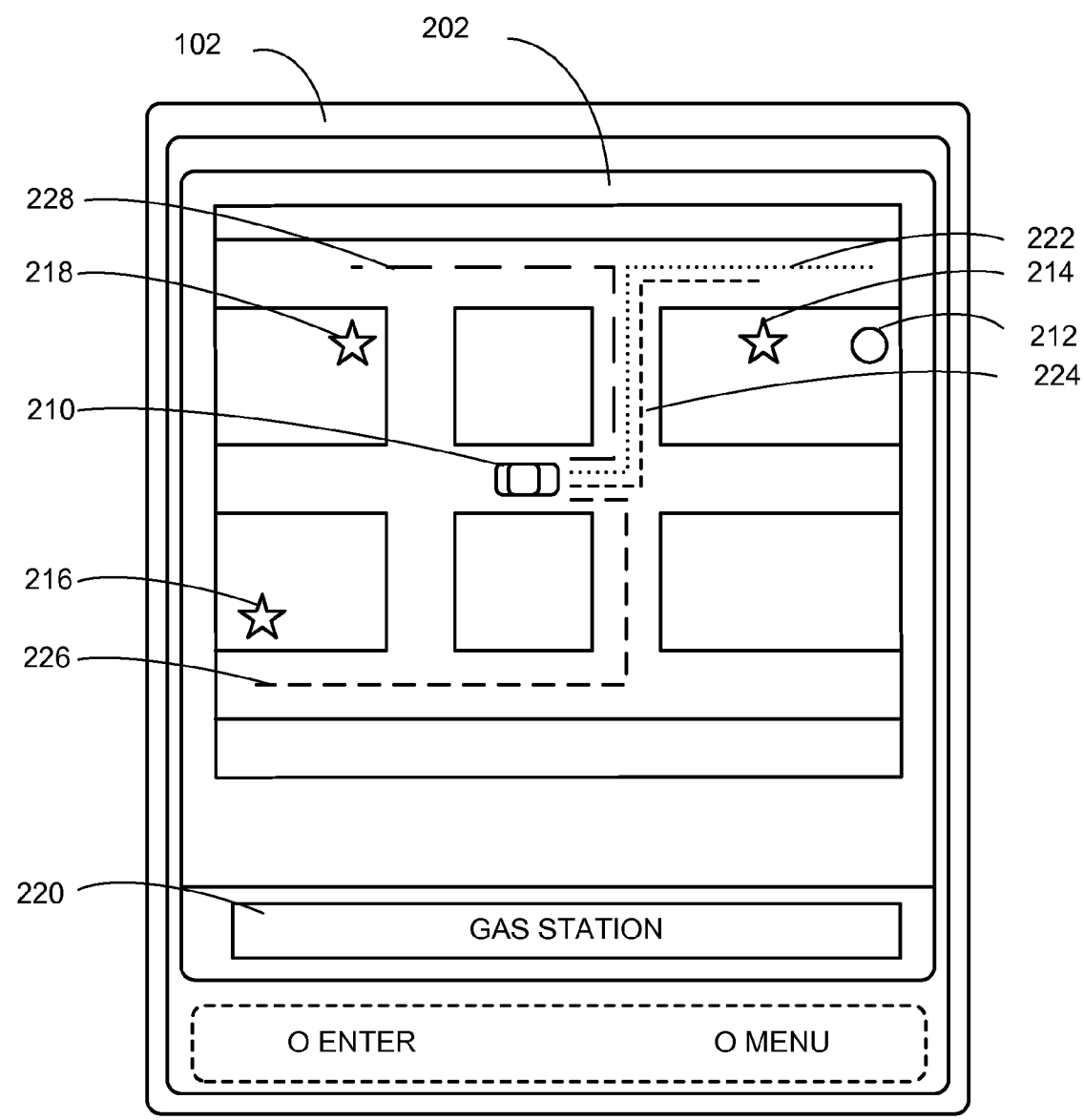
FIG. 2 is a first example of a display interface of the first device.

Referring now to FIG. 2, therein is shown a first example of a display interface 202 of the first device 102. The display interface 202 shows a current location 210 of the navigation system 100 of FIG. 1 while navigating to a destination location 212 along a primary route 222.

The navigation system 100 can receive a search term 220 and can identify a first point of interest 214 matching the search term 220. The navigation system 100 can calculate a first proposed route 224 from the current location 210 to the first point of interest 214.

The navigation system 100 can also identify a second point of interest 216 and a third point of interest 218, both matching the search term 220. The navigation system 100 can also calculate a second proposed route 226 to the second point of interest 216 and a third proposed route 228 to the third point of interest 218 from the current location 210.

The first point of interest 214 represents the highest ranked and most desirable location for the user based on the search term 220 and the direction of travel. Desirability is defined as qualities or properties of an entity that are considered advantageous or beneficial to the user of the present invention. The first point of interest 214 can represent an entity such as a restaurant, business, school, scenic viewpoint, object, coordinate, or any combination thereof.

For example, The second point of interest 216 can represent an entity with an identifiable location as shown behind the current location 210 based on the current direction of travel and is less desirable for the user. The third point of interest 218 can represent another entity with an identifiable location that is not located on the primary route 222 and is less desirable for the user.

Figure 3:
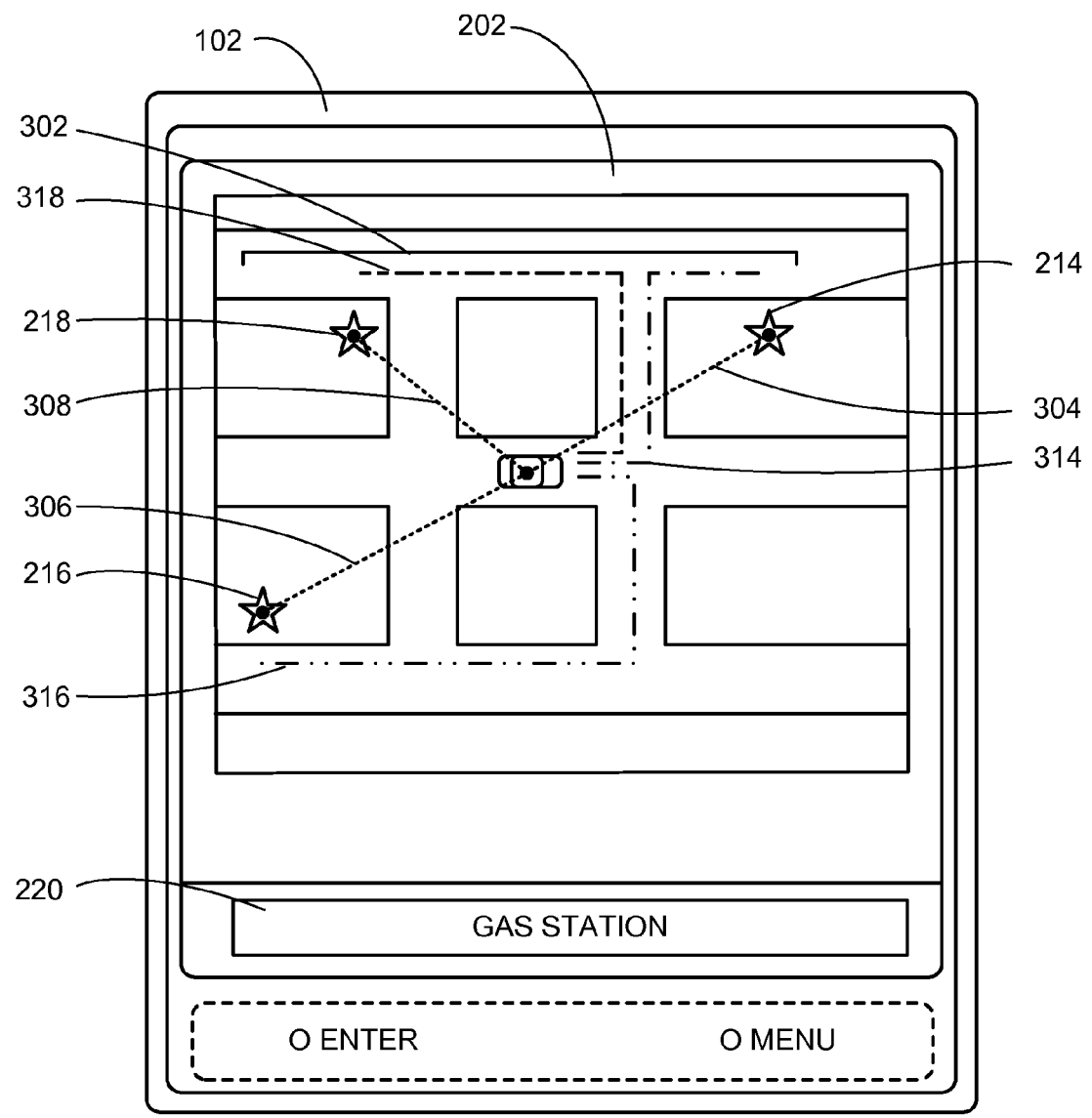
FIG. 3 is a second example of the display interface.

Referring now to FIG. 3, therein is shown a second example of the display interface 202. The display interface 202 can depict the situation where the navigation system 100 is performing a search for the search term 220. The highest ranked locations are displayed as a set of candidate points of interest 302 and can include the first point of interest 214, the second point of interest 216, and the third point of interest 218.

The display interface 202 can also depict the first estimated distance 304, a second estimated distance 306, and a third estimated distance 308. The first estimated distance 304 represents the distance between the current location 210 and the first point of interest 214. The second estimated distance 306 can represent the distance between the current location 210 and the second point of interest 216. The third estimated distance 308 can represent the distance between the current location 210 and the third point of interest 218.

The display interface 202 can depict a first actual distance 314, a second actual distance 316, and a third actual distance 318. The first actual distance 314 represents the distance from the current location 210 to the first point of interest 214 along the first proposed route 224. The second actual distance 316 represents the distance from the current location 210 to the second point of interest 216 along the second proposed route 226 of FIG. 2. The third actual distance 318 represent the distance from the current location 210 to the third point of interest 218 along the third proposed route 228 of FIG. 2.

The user can enter the search term 220 "Gas Station" for a search for entries that have the term "gas station" associated with them. Each entry has static information that defines the properties of the entry. The navigation system 100 can search the static information associated with the entries to identify the entries that have the term "gas station". After the candidate entries have been identified, the navigation system 100 can calculate a dynamic ranking of each candidate entry to determine which is the most desirable.

The dynamic ranking is based on the location of the user, the estimated or actual distance to the candidate location, and the ability of the user to reach the candidate location at a valid time. Reaching the candidate location at a valid time indicates that by the time the user drives to that location, the candidate location is still open and accessible. If the candidate location cannot be reached before closing time, then the candidate location gets a low ranking and the navigation system 100 will not display it on the display interface. This allows the navigation system 100 to display the candidate target destinations that are reachable or display the only candidate target destinations that are reachable.

Figure 4:
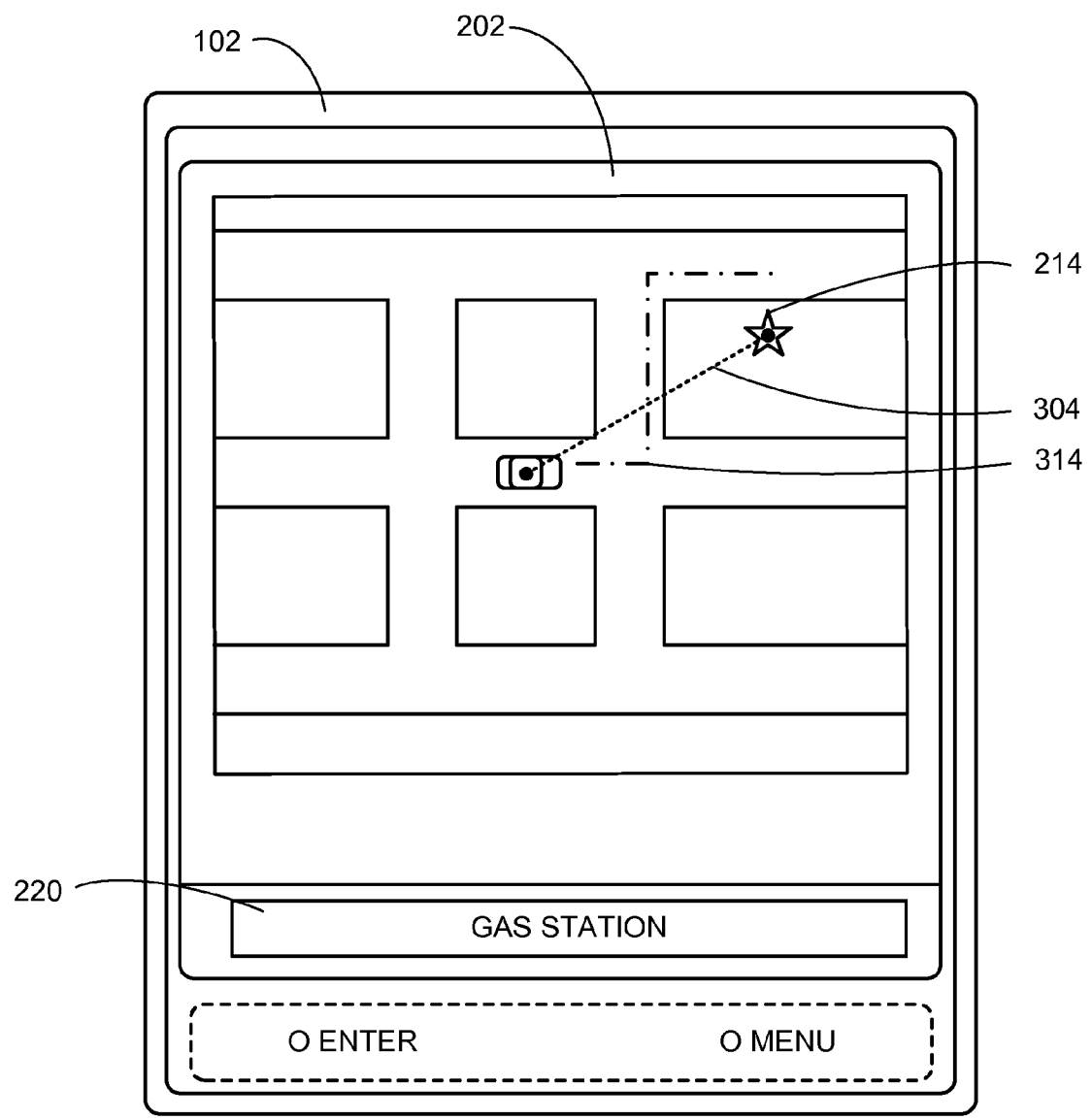
FIG. 4 is a third example of the display interface.

Referring now to FIG. 4, therein is shown a third example of the display interface 202. The display interface 202 shows only the first point of interest 214 that represents a gas station. This can depict the situation where the navigation system 100 has ranked the candidate points of interest 302 of FIG. 3, eliminated those with a low ranking, and only displays those with high ranking.

For example, the first point of interest 214 can represent a gas station that is open 24-hours a day and has a high ranking. The second point of interest 216 of FIG. 2 can represent a gas station that is closed for the season and has a low ranking. The third point of interest 218 of FIG. 2 can represent a gas station that cannot be reached during opening hours and also has a low ranking.

In this example, the navigation system 100 displays only the gas station with the high ranking to minimize the clutter on the display interface 202. This simplifies the task of searching for a target location by eliminating those gas stations that will not be available by the time the user navigates there.

Figure 5:
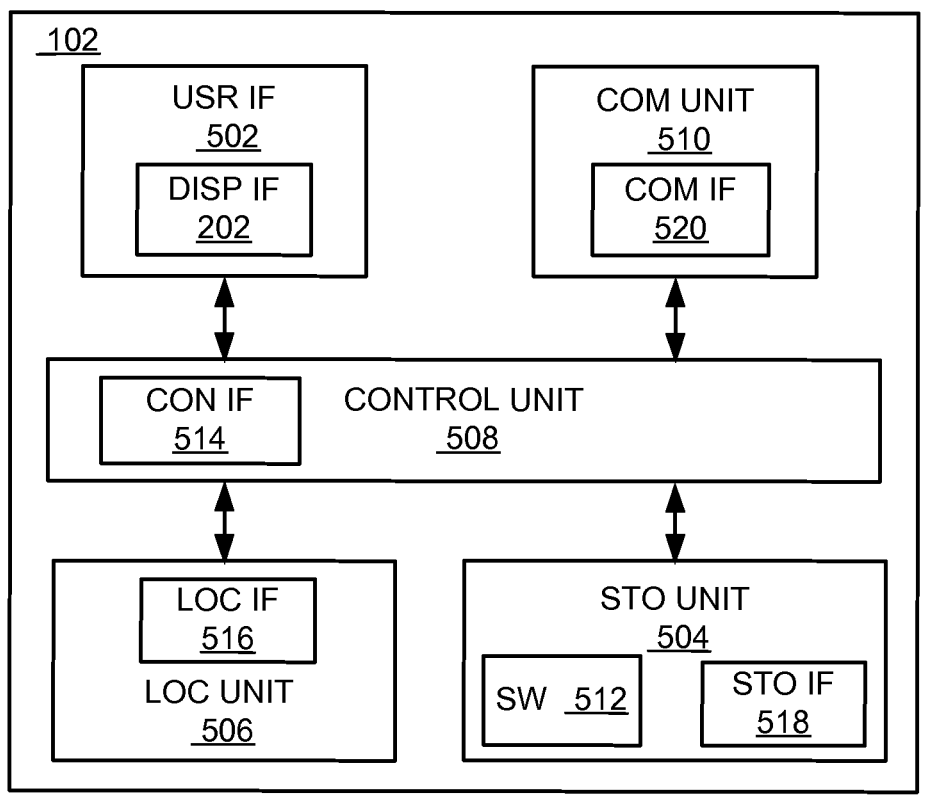
FIG. 5 is an exemplary block diagram of the first device.

Referring now to FIG. 5, therein is shown an exemplary block diagram of the first device 102. The first device 102 can include a user interface 502, a storage unit 504, a location unit 506, a control unit 508, and a communication unit 510.

The user interface 502 allows a user (not shown) to interface and interact with the first device 102. The user interface 502 can include an input device and an output device. Examples of the input device of the user interface 502 can include a keypad, a touchpad, soft-keys, a keyboard, a microphone, or any combination thereof to provide data and communication inputs. Examples of the output device of the user interface 502 can include the display interface 202. The display interface 202 can include a display, a projector, a video screen, a speaker, or any combination thereof.

The control unit 508 can execute a software 512 to provide the intelligence of the navigation system 100. The control unit 508 can operate the user interface 502 to display information generated by the navigation system 100. The control unit 508 can also execute the software 512 for the other functions of the navigation system 100, including receiving location information from the location unit 506. The control unit 508 can further execute the software 512 for interaction with the communication path 104 of FIG. 1 via the communication unit 510.

The control unit 508 can be implemented in a number of different manners. For example, the control unit 508 can be a processor, an embedded processor, a microprocessor, a hardware control logic, a hardware finite state machine (FSM), a digital signal processor (DSP), or a combination thereof.

The control unit 508 can include a controller interface 514. The controller interface 514 can be used for communication between the control unit 508 and other functional units in the first device 102. The controller interface 514 can also be used for communication that is external to the first device 102.

The controller interface 514 can receive information from the other functional units or from external sources, or can transmit information to the other functional units or to external destinations. The external sources and the external destinations refer to sources and destinations external to the first device 102.

The controller interface 514 can be implemented in different ways and can include different implementations depending on which functional units or external units are being interfaced with the controller interface 514. For example, the controller interface 514 can be implemented with a pressure sensor, an inertial sensor, a micro-electromechanical system (MEMS), optical circuitry, waveguides, wireless circuitry, wireline circuitry, or a combination thereof.

The location unit 506 can generate location information, current heading, and a current speed 742 of the first device 102, as examples. The location unit 506 can be implemented in many ways. For example, the location unit 506 can function as at least a part of a global positioning system (GPS), an inertial navigation system, a cellular-tower location system, a pressure location system, or any combination thereof.

The location unit 506 can include a location interface 516. The location interface 516 can be used for communication between the location unit 506 and other functional units in the first device 102. The location interface 516 can also be used for communication that is external to the first device 102.

The location interface 516 can receive information from the other functional units or from external sources, or can transmit information to the other functional units or to external destinations. The external sources and the external destinations refer to sources and destinations external to the first device 102.

The location interface 516 can include different implementations depending on which functional units or external units are being interfaced with the location unit 506. The location interface 516 can be implemented with technologies and techniques similar to the implementation of the controller interface 514.

The storage unit 504 can store the software 512. The storage unit 504 can also store the relevant information, such as messages, notifications, points of interest (POI), navigation routing entries, or any combination thereof.

The storage unit 504 can be a volatile memory, a nonvolatile memory, an internal memory, an external memory, or a combination thereof. For example, the storage unit 504 can be a nonvolatile storage such as non-volatile random access memory (NVRAM), Flash memory, disk storage, or a volatile storage such as static random access memory (SRAM).

The storage unit 504 can include a storage interface 518. The storage interface 518 can be used for communication between the location unit 506 and other functional units in the first device 102. The storage interface 518 can also be used for communication that is external to the first device 102.

The storage interface 518 can receive information from the other functional units or from external sources, or can transmit information to the other functional units or to external destinations. The external sources and the external destinations refer to sources and destinations external to the first device 102.

The storage interface 518 can include different implementations depending on which functional units or external units are being interfaced with the storage unit 504. The storage interface 518 can be implemented with technologies and techniques similar to the implementation of the controller interface 514.

The communication unit 510 can enable external communication to and from the first device 102. For example, the communication unit 510 can permit the first device 102 to communicate with the second device 106 of FIG. 1, an attachment, such as a peripheral device or a computer desktop, and the communication path 104.

The communication unit 510 can also function as a communication hub allowing the first device 102 to function as part of the communication path 104 and not limited to be an end point or terminal unit to the communication path 104. The communication unit 510 can include active and passive components, such as microelectronics or an antenna, for interaction with the communication path 104.

The communication unit 510 can include a communication interface 520. The communication interface 520 can be used for communication between the communication unit 510 and other functional units in the first device 102. The communication interface 520 can receive information from the other functional units or can transmit information to the other functional units.

The communication interface 520 can include different implementations depending on which functional units are being interfaced with the communication unit 510. The communication interface 520 can be implemented with technologies and techniques similar to the implementation of the controller interface 514.

For illustrative purposes, the navigation system 100 is shown with the partition having the user interface 502, the storage unit 504, the location unit 506, the control unit 508, and the communication unit 510 although it is understood that the navigation system 100 can have a different partition. For example, the software 512 can be partitioned differently such that some or all of its function can be in the control unit 508, the location unit 506, and the communication unit 510. Also, the first device 102 can include other functional units not shown in FIG. 5 for clarity.

The functional units in the first device 102 can work individually and independently of the other functional units. The first device 102 can work individually and independently from the second device 106 and the communication path 104.

The navigation system 100 can include the control unit 508 coupled to the communication unit 510. The navigation system 100 can include the display interface 202, the storage unit 504, and the controller interface 514 coupled to the control unit 508.

Figure 6:
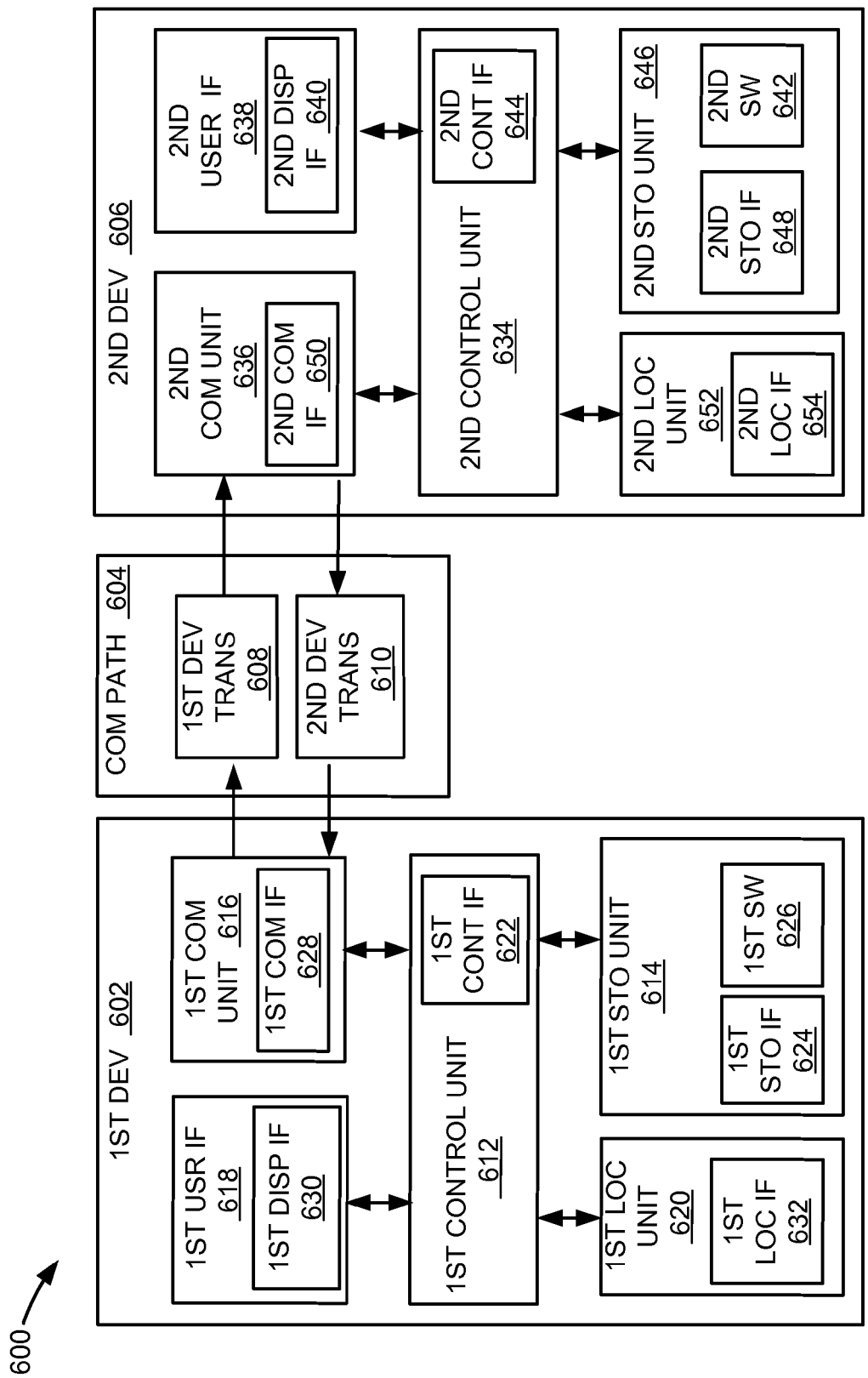
FIG. 6 is an exemplary block diagram of a navigation system with point of interest ranking mechanism in a second embodiment of the present invention.

Referring now to FIG. 6, therein is shown an exemplary block diagram of a navigation system 600 with point of interest ranking mechanism in a second embodiment of the present invention. The navigation system 600 can include a first device 602, a communication path 604, and a second device 606.

The first device 602 can communicate with the second device 606 over the communication path 604. For example, the first device 602, the communication path 604, and the second device 606 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 600.

The first device 602 can send information in a first device transmission 608 over the communication path 604 to the second device 606. The second device 606 can send information in a second device transmission 610 over the communication path 604 to the first device 602.

For illustrative purposes, the navigation system 600 is shown with the first device 602 as a client device, although it is understood that the navigation system 600 can have the first device 602 as a different type of device. For example, the first device 602 can be a server.

Also for illustrative purposes, the navigation system 600 is shown with the second device 606 as a server, although it is understood that the navigation system 600 can have the second device 606 as a different type of device. For example, the second device 606 can be a client device.

For brevity of description in this embodiment of the present invention, the first device 602 will be described as a client device and the second device 606 will be described as a server device. The present invention is not limited to this selection for the type of devices. The selection is an example of the present invention.

The first device 602 can include a first control unit 612, a first storage unit 614, a first communication unit 616, a first user interface 618, and a first location unit 620. The first device 602 can be similarly described by the first device 102.

The first control unit 612 can include a first controller interface 622. The first control unit 612 and the first controller interface 622 can be similarly described as the control unit 508 of FIG. 5 and the controller interface 514 of FIG. 5, respectively.

The first storage unit 614 can include a first storage interface 624. The first storage unit 614 and the first storage interface 624 can be similarly described as the storage unit 504 of FIG. 5 and storage interface 518 of FIG. 5, respectively. A first software 626 can be stored in the first storage unit 614.

The first communication unit 616 can include a first communication interface 628. The first communication unit 616 and the first communication interface 628 can be similarly described as the communication unit 510 of FIG. 5 and the communication interface 520 of FIG. 5, respectively.

The first user interface 618 can include a first display interface 630. The first user interface 618 and the first display interface 630 can be similarly described as the user interface 502 of FIG. 5 and the display interface 202 of FIG. 5, respectively.

The first location unit 620 can include a first location interface 632. The first location unit 620 and the first location interface 632 can be similarly described as the location unit 506 of FIG. 5 and the location interface 516 of FIG. 5, respectively.

The performance, architectures, and type of technologies can also differ between the first device 102 and the first device 602. For example, the first device 102 can function as a single device embodiment of the present invention and can have a higher performance than the first device 602. The first device 602 can be similarly optimized for a multiple device embodiment of the present invention.

For example, the first device 102 can have a higher performance with increased processing power in the control unit 508 compared to the first control unit 612. The storage unit 504 can provide higher storage capacity and access time compared to the first storage unit 614.

Also for example, the first device 602 can be optimized to provide increased communication performance in the first communication unit 616 compared to the communication unit 510. The first storage unit 614 can be sized smaller compared to the storage unit 504. The first software 626 can be smaller than the software 512 of FIG. 5.

The second device 606 can be optimized for implementing the present invention in a multiple device embodiment with the first device 602. The second device 606 can provide the additional or higher performance processing power compared to the first device 602. The second device 606 can include a second control unit 634, a second communication unit 636, a second location unit 652, and a second user interface 638.

The second user interface 638 allows a user (not shown) to interface and interact with the second device 606. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 600. The second software 642 can operate in conjunction with the first software 626. The second control unit 634 can provide additional performance compared to the first control unit 612 or the control unit 508.

The second control unit 634 can operate the second user interface 638 to display information. The second control unit 634 can also execute the second software 642 for the other functions of the navigation system 600, including operating the second communication unit 636 to communicate with the first device 602 over the communication path 604.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 606. The second controller interface 644 can also be used for communication that is external to the second device 606.

The second controller interface 644 can receive information from the other functional units or from external sources, or can transmit information to the other functional units or to external destinations. The external sources and the external destinations refer to sources and destinations external to the second device 606.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as notifications, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 600 is shown with the second storage unit 646 as a single hierarchy storage system, although it is understood that the navigation system 600 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as nonvolatile random access memory (NVRAM), Flash memory, disk storage, or a volatile storage such as static random access memory (SRAM).

The second storage unit 646 can include a second storage interface 648. The second storage interface 648 can be used for communication between the location unit 506 and other functional units in the second device 606. The second storage interface 648 can also be used for communication that is external to the second device 606.

The second storage interface 648 can receive information from the other functional units or from external sources, or can transmit information to the other functional units or to external destinations. The external sources and the external destinations refer to sources and destinations external to the second device 606.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 606. For example, the second communication unit 636 can permit the second device 606 to communicate with the first device 602 over the communication path 604.

The second communication unit 636 can also function as a communication hub allowing the second device 606 to function as part of the communication path 604 and not limited to be an end point or terminal unit to the communication path 604. The second communication unit 636 can include active and passive components, such as microelectronics or an antenna, for interaction with the communication path 604.

The second communication unit 636 can include a second communication interface 650. The second communication interface 650 can be used for communication between the second communication unit 636 and other functional units in the second device 606. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 604 to send information to the second device 606 in the first device transmission 608. The second device 606 can receive information in the second communication unit 636 from the first device transmission 608 of the communication path 604.

The second communication unit 636 can couple with the communication path 604 to send information to the first device 602 in the second device transmission 610. The first device 602 can receive information in the first communication unit 616 from the second device transmission 610 of the communication path 604. The navigation system 600 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 606 can include other functional units not shown in FIG. 6 for clarity.

The second location unit 652 can include a second location interface 654. The second location unit 652 can be used to determine the location of the navigation system 600.

The second location unit 652 can be implemented in different ways and can include different implementation depending on which functional units or external units are being interfaced with the second location interface 654. For example, the second location unit 652 can be implemented with a cell tower triangulation unit, inertial navigation unit, cell detection unit, WiFi location unit, GPS unit, or any combination thereof.

The second location interface 654 can also receive information from other functional units or from external sources, or can transmit information to other functional units or to external destinations. The external source and the external destinations refer to sources and destinations external to the second device 606.

The functional units in the first device 602 can work individually and independently of the other functional units. The first device 602 can work individually and independently from the second device 606 and the communication path 604.

The functional units in the second device 606 can work individually and independently of the other functional units. The second device 606 can work individually and independently from the first device 602 and the communication path 604.

For illustrative purposes, the navigation system 600 is described by operation of the first device 602 and the second device 606. It is understood that the first device 602 and the second device 606 can operate any of the modules and functions of the navigation system 600. For example, the first device 602 is described to operate the first location unit 620, although it is understood that the second device 606 can also operate the first location unit 620.

Figure 7:
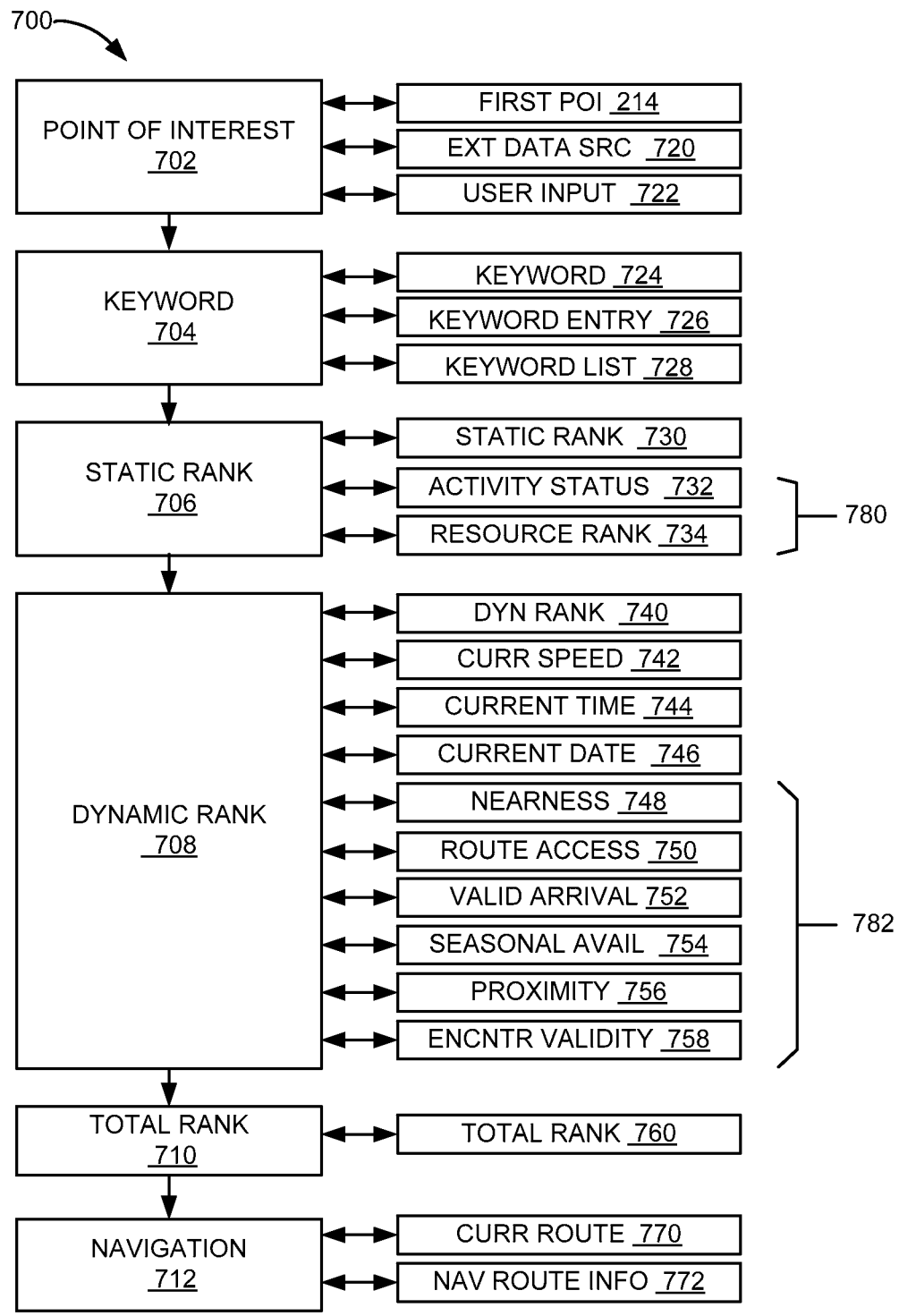
FIG. 7 is a navigation system with point of interest ranking mechanism in a third embodiment of the present invention.

Referring now to FIG. 7, therein is shown a navigation system 700 with point of interest ranking mechanism in a third embodiment of the present invention. The navigation system 700 can rank the points of interest, search for the candidate points of interest 302 of FIG. 3, select the first point of interest 214 of FIG. 2, and navigate to the first point of interest 214 by operating the display interface 202 of FIG. 2 by presenting a navigation routing information 772.

The navigation routing information 772 represents the information needed to navigate along a current route 770 to the first point of interest 214. The navigation routing information 772 can include map tiles, directional information, navigation commands, landmarks, points of interest, audio information, video information, graphical information or any combination thereof. The navigation routing information 772 is presented on the display interface 202 to enable the user to physically navigate to the first point of interest 214.

The navigation system 700 can include a point of interest module 702, a keyword module 704, a static rank module 706, a dynamic rank module 708, a total rank module 710, and a navigation module 712.

In the navigation system 700, as an example, each module is indicated by a number and successively higher module numbers follow one another. Control flow can pass from one module to the next higher numbered module unless explicitly otherwise indicated.

The navigation system 700 can be operated in several different ways. For example, the navigation system 700 can be included in and operated by running the software 512 of FIG. 5. In another example, the navigation system 700 can be partitioned between and operated by running the first software 626 of FIG. 6, the second software 642 of FIG. 6, or a combination thereof.

The navigation system 700 can generate the first point of interest 214 in the point of interest module 702. The point of interest module 702 can generate the first point of interest 214 of FIG. 2 and associate information from an external data source 720 with the first point of interest 214. After the first point of interest 214 has been generated, the control flow can be transferred to the keyword module 704.

The first point of interest 214 can represent a named entity with an identifiable location. The first point of interest 214 can represent an entity such as a restaurant, business, school, scenic viewpoint, object, coordinate, or any combination thereof. The first point of interest 214 can include associated information including a name, an operating schedule, a type, a facility, a resource, or any combination thereof. The first point of interest 214 can be stored in a memory such as the storage unit 504 of FIG. 5, the first storage unit 614 of FIG. 6, the second storage unit 646 of FIG. 6, distributed between the first storage unit 614 and the second storage unit 646, a local storage, a remote storage, a database, a cache memory, or any combination thereof.

The first point of interest 214 can be generated by creating the named entity and associating a location with the named entity. A keyword 724 represents a name of the first point of interest 214 as one possible form to identify the first point of interest 214. The named entity can be created in a variety of methods. The named entity can be created by manually entering the title of the named entity and entering the location. The named entity can also be created by importing information from the external data source 720 that can describe the named entity and the associated location.

The external data source 720 can include third party data sources, commercial services, community ratings, web services, or any combination thereof. The generation of the first point of interest 214 can be user-initiated or automatically performed based on the import of the external data.

For example, the first point of interest 214 can be manually generated by the user who navigates to a particular location, manually creates a named entry for the first point of interest 214 using the user interface 502, and associates the current location 210 to the first point of interest 214. In another example, the navigation system 700 can import the external data source 720 that includes the list of restaurants in the local area and their geographical coordinates. The navigation system 700 can generate the first point of interest 214 from the restaurant name and location information imported from the external data source 720.

The first point of interest 214 can be associated with the information from a user input 722 and from the external data source 720. The user can select the first point of interest 214 on the user interface 502 and enter information related to the first point of interest 214. For example, in the situation where a convenience store has recently installed gasoline pumps, the user could select the first point of interest 214 that represents the convenience store, enter the term "gasoline", and enter the value "yes" to indicate that gasoline is available at the first point of interest 214 representing the convenience store.

The first point of interest 214 can be associated with information from the external data source 720 in a variety of methods. For example, the first point of interest 214 can be associated with information from the external data source 720 by identifying entries in the external data source 720 that have the same name identifier as the first point of interest 214.

In another example, the first point of interest 214 can be associated with an entry in the external data source 720 by matching the name and location of the first point of interest 214 with the entry. In yet another example, the first point of interest 214 can be associated with the entry in the external data source 720 that includes a link from the entry to the first point of interest 214. The link from the entry can include a hyperlink, references to the identifier of the first point of interest 214, references to the name of the first point of interest 214, or any combination thereof.

The navigation system 700 can associate the keyword 724 with the first point of interest 214 in the keyword module 704. The keyword module 704 can allow the keyword 724 to be associated with the first point of interest 214. After the keyword 724 has been associated with the first point of interest 214, the control flow can be transferred to the static rank module 706.

The keyword 724 can represent an identifier describing an attribute of the first point of interest 214. The keyword 724 can include identifiers describing attributes such as name, type of the point of interest, resources available, ratings, features, hour of operation, or any combination thereof.

The keyword 724 can be associated with the first point of interest 214 by creating a logical link between the first point of interest 214 and the keyword 724. The logical link establishes a relationship between the two that allows information associated with the keyword 724 to be retrieved using the first point of interest 214 as an index value describing the entity. The logical link can be implemented in a variety of methods including database pointers, array pointers, linked lists, named references, or a combination thereof.

For example, the keyword 724 and the first point of interest 214 can be associated by identifying the first point of interest 214 and selecting the keyword 724 from a keyword list 728 on the user interface 502. If the keyword 724 does not exist in the keyword list 728, then the user interface 502 can allow the entry of a keyword entry 726 and create the keyword 724, adding it to the keyword list 728.

In a further example, the first point of interest 214 can represent a gas station. The keyword "diesel fuel" can be associated with the first point of interest 214 such that the navigation system can retrieve values associated with the keyword 724. Values associated with the keyword 724 can include a static rank 730, a dynamic rank 740, availability, grade, or any combination thereof. The user can identify the first point of interest 214 and then select the keyword 724 from the keyword list 728 that is displayed on the user interface 502.

The navigation system 700 can calculate the static rank 730 of the keyword 724 for the first point of interest 214 in the static rank module 706. The static rank 730 for the keyword 724 can indicate the desirability of the first point of interest 214 for the keyword 724 based on factors that are not time-sensitive. After the static rank 730 for the keyword 724 has been calculated, the control flow can pass to the dynamic rank module 708.

The static rank 730 can be calculated for the keyword 724 associated with the first point of interest 214 that indicates the desirability of the first point of interest 214 based on one or more of static ranking components 780. The static rank 730 can include the static ranking components 780 based on time-invariant factors. The static ranking components 780 can include an activity status 732 and a resource rank 734.

The static rank 730 of the keyword 724 is static because it is calculated using factors that are independent of direct changes in the time and date. The static rank 730 can change when new information is acquired from the user input 722 or the external data source 720 and associated with the first point of interest 214. The static rank 730 with a higher value indicates that the first point of interest 214 is more desirable for the keyword 724.

For example, the static rank 730 can be represented by a scalar value from one to one hundred indicating the ranking and desirability of the keyword 724 for the first point of interest 214. If the first point of interest 214 has the keyword 724 "gasoline" with the static rank 730 set to "95", then the first point of interest 214 is considered desirable when searching for locations that have gasoline.

The static rank 730 of the keyword 724 associated with the first point of interest 214 can be calculated based on the activity status 732 and the resource rank 734. The static rank 730 can be a single value or a vector value with each static component being an element in the vector. The static ranking components 780 can be combined in a variety of methods including adding the static ranking components 780 together, setting the static ranking components 780 as elements in a vector representing the static rank 730, multiplying the static ranking components 780 together, or any combination thereof. The static ranking components 780 can be determined by processing information associated with the first point of interest 214 from the external data source 720 or from the user input 722. The static ranking components 780 are described in detail in a later section.

The activity status 732 is a static ranking component that can indicate that an activity has occurred at the first point of interest 214. The activity can include the occurrence of a special event, a meeting, a conference, a recent sales activity, a party, or any combination thereof.

The activity status 732 can be calculated for the keyword 724 associated with the first point of interest 214 by detecting the occurrence of an action at the first point of interest 214. The activity status 732 for the keyword 724 can be assigned a weighted value to indicate that activity has occurred at the first point of interest 214. The details about the activity status 732 are provided in a later section.

The resource rank 734 is a static ranking component that can indicate the presence or availability of a particular resource at the first point of interest 214. Examples of the resource can include diesel fuel, water, picnic tables, banquet rooms, outdoor seating, or any combination thereof. The resource rank 734 for the keyword can be based on the resource being available for the keyword 724 at the first point of interest 214. The resource rank 734 can be calculated by determining the presence of the resource at the first point of interest 214 and increasing the resource rank 734. The resource rank 734 can be calculated using information from the external data source 720. For example, the resource rank 734 of a conference room at the first point of interest 214 can be set to 1 if the external data source 720 indicates that there is a conference room at the first point of interest 214. Further details about the resource rank 734 are provided in a later section.

For example, the static rank 730 can be represented by a scalar value from one to one hundred indicating the ranking and desirability of the keyword 724 for the first point of interest 214. The first point of interest 214 can represent a truck stop diner called "Dine-n-Drive." The keyword 724 "restaurant" is associated with the first point of interest 214 and can have the static rank 730 of "100" indicating that it is definitely a restaurant. The keyword 724 "barbeque" is also associated with the first point of interest 214 and it can have the static rank 730 of "90" that indicates that it is highly desirable for "barbeque". The keyword 724 "dessert" can be associated with the first point of interest 214 and it can have the static rank 730 of "20" that indicates that "dessert" is not desirable at the first point of interest 214.

The navigation system 700 can calculate the dynamic rank 740 for the keyword 724 of the first point of interest 214 in the dynamic rank module 708. The dynamic rank 740 for the keyword 724 can indicate the desirability of the first point of interest 214 based on dynamic ranking components 782. After the dynamic rank 740 has been calculated, the control flow can be transferred to the total rank module 710.

The dynamic rank 740 is based on a combination of the dynamic ranking components 782, the current location 210, a current time 744, and a current date 746. The current location 210 can be identified by reading the location coordinates from the location unit 506. The dynamic ranking components 782 can include a proximity 756, an encounter validity 758 a nearness 748, a route accessibility 750, a valid arrival 752, and a seasonal availability 754. The dynamic ranking components 782 are described in detail in a later section.

The dynamic rank 740 can represent a relevant match listing of the first point of interest 214 based on a proximity 756 of the current location 210 to the first point of interest 214 and an encounter validity 758 based on the arrival time 926 at the first point of interest 214. The dynamic rank 740 can be calculated in a variety of methods.

For example, the dynamic rank 740 can be calculated by dividing the encounter validity 758 by the proximity 756. The proximity 756 can indicate the distance from the current location 210 to the first point of interest 214. The proximity 756 can be calculated by determining the distance between the current location 210 and the first point of interest 214 along the current route 770. The encounter validity 758 can indicate whether the user can arrive at the first point of interest 214 when the first point of interest 214 is open by traversing the distance of the proximity 756 at the current speed 742. The encounter validity 758 can vary between a value of 1 and 0.

In another example, the dynamic rank 740 can be calculated by multiplying the proximity 756 by the encounter validity 758. If the encounter validity 758 has a value of 0, indicating that the first point of interest 214 cannot be reached from the current location 210 at a time when the first point of interest 214 is open, then the dynamic rank 740 would be 0. A dynamic rank 740 with a value of 0 would indicate that the first point of interest 214 is not desirable.

The dynamic rank 740 can indicate the desirability of the first point of interest 214 for the keyword 724. The desirability of the dynamic rank 740 can the likelihood of being able to traverse the distance of the proximity 756 and reach the first point of interest 214 at a time when the first point of interest 214 is open. The dynamic rank 740 with a higher value indicates that the first point of interest 214 is more desirable for the keyword 724.

The dynamic rank 740 is considered dynamic because it is calculated each time the navigation system 700 performs a new search and is dependent on time and location factors. The dynamic rank 740 can be used to select the first point of interest 214 for displaying on the first device 102.

The dynamic rank 740 can be a single value or a vector value with each of the dynamic ranking components 782 being an element in the vector. A vector value represents multiple individual values. For example, the dynamic rank 740 can be represented by a vector value that includes the proximity 756, the encounter validity 758, the nearness 748, the route accessibility 750, the valid arrival 752, and the seasonal availability 754. The dynamic rank 740 can be calculated in a variety of methods including summing all the dynamic ranking components 782, multiplying the dynamic ranking components 782 together, or any combination thereof.

It has been discovered that the present invention provides the navigation system 700 with point of interest ranking with improved accuracy for selecting the first point of interest 214 by calculating the dynamic rank 740. The dynamic rank 740 and the encounter validity 758 can determine if the user can arrive at the first point of interest 214 at a valid time within operating hours 924 of the first point of interest 214. The navigation system 700 or the dynamic rank module 708 can increase the accuracy of selecting the first point of interest 214 using the dynamic rank 740 by only displaying the candidate points of interest 302 that can be reached at a valid time. This allows for an improved navigation experience where the navigation system 700 can more efficiently select a desired location based on the operating hours 924 and distance from the current location 210.

The navigation system 700 can calculate a total rank 760 of the keyword 724 for the first point of interest 214 in the total rank module 710. The total rank 760 for the keyword 724 can indicate the desirability of the first point of interest 214 based on both static and dynamic factors. After the total rank 760 has been calculated, the control flow can be transferred to the navigation module 712.

The total rank 760 represents the rating for the keyword 724 associated with the first point of interest 214 that indicate the total desirability of the first point of interest 214 based on the combination of the static rank 730 and the dynamic rank 740. The total rank 760 with a higher value can indicate that the first point of interest 214 is more desirable for the keyword 724. The first point of interest 214 can be selected based on the total rank 760.

The total rank 760 can be calculated by combining the static rank 730 and the dynamic rank 740 to determine the first point of interest 214 that is highest rated in a variety of methods. For example, the total rank 760 can be calculated by adding the static rank 730 and the dynamic rank 740, by multiplying the static rank 730 to the dynamic rank 740, by setting the static rank 730 and the dynamic rank 740 as elements of a vector representing the total rank 760, or any combination thereof. The static rank 730 and the dynamic rank 740 can also be weighted differently to favor one ranking over the other.

It has also been discovered that the present invention provides the navigation system 700 with point of interest ranking that improves the accuracy of selecting the desired point of interest by combining both static and dynamic factors when ranking the candidate points of interest 302. By identifying the candidate points of interest 302 that have the highest values for the total rank 760, the selection of the first point of interest 214 can be simplified allowing the selection of the target destination to be easier, faster, and more efficient.

The navigation system 700 can navigate to the first point of interest 214 in the navigation module 712. The navigation module 712 can select the first point of interest 214 as a target destination, calculate the current route 770 to the first point of interest 214, and present the navigation routing information 772 on the display interface 202.

The first point of interest 214 can be selected by displaying the candidate points of interest 302 on the display interface 202 and allowing the user to indicate the desired candidate. The candidate points of interest 302 can represent the target destination where the total rank 760 is highest. The navigation system 700 can calculate the navigation routing information 772 for the current route 770 to the first point of interest 214 that has been selected.

The navigation routing information 772 can be calculated using the current location 210 and the first point of interest 214 to define the starting and ending locations for the current route 770. The current route 770 can be calculated using a variety of methods including lowest cost, shortest time, shortest distance, easiest route, or any combination thereof.

The navigation system 700 can be implemented with the navigation system 100 of FIG. 1. Each module of the navigation system 700 can be implemented using a combination of functional units of the first device 102 of FIG. 5. For example, the navigation system 700 can be implemented by running the software 512 of FIG. 5 on the control unit 508 of FIG. 5.

The point of interest module 702 can be implemented with the first device 102 of FIG. 1. The point of interest module 702 can be implemented with the user interface 502 of FIG. 5, the display interface 202, the control unit 508 of FIG. 5, the controller interface 514 of FIG. 5, the software 512 of FIG. 5, the storage unit 504 of FIG. 5, the storage interface 518 of FIG. 5, the location unit 506 of FIG. 5, the location interface 516 of FIG. 5, the communication unit 510 of FIG. 5, the communication interface 520 of FIG. 5 or a combination thereof.

For example, the navigation system 700 can use the control unit 508 to retrieve the name of an entry from the storage unit 504 and retrieve the current location 210 from the location unit 506 to generate the first point of interest 214. In another example, the navigation system 700 can use the user interface 502 to enter a name for the first point of interest 214 and retrieve the current location 210 from the location unit 506 to generate the first point of interest 214. The first point of interest 214 can be generated by linking a name and a location.

The point of interest module 702 can be implemented with the navigation system 600 of FIG. 6 using the first device 602 of FIG. 6 and the second device 606 of FIG. 6. The point of interest module 702 can be implemented with the first user interface 618 of FIG. 6, the first display interface 630 of FIG. 6, the first control unit 612 of FIG. 6, the first storage unit 614 of FIG. 6, the first communication unit 616 of FIG. 6, or a combination thereof. For example, the navigation system 600 can use the first control unit 612 and the second storage unit 646 to generate the first point of interest 214.

The keyword module 704 can be implemented with the first device 102. The keyword module 704 can be implemented with the user interface 502, the control unit 508, the controller interface 514, the communication unit 510, the software 512, the storage unit 504, the storage interface 518, or a combination thereof. The user interface 502 can be used to select the keyword 724 and associate it with the first point of interest 214.

For example, the navigation system 700 can use the user interface 502, the control unit 508, and the storage unit 504 to associate the keyword 724 with the first point of interest 214. The user interface 502 can be used to select the keyword 724 from the keyword list 728.

The static rank module 706 can be implemented with the first device 102. The static rank module 706 can be implemented with the control unit 508, the controller interface 514, the communication unit 510, the software 512, the storage unit 504, the storage interface 518, or a combination thereof. For example, the navigation system 700 can calculate the static rank 730 by using the control unit 508 to retrieve static ranking component information from the storage unit 504.

The dynamic rank module 708 can be implemented with the first device 102. The dynamic rank module 708 can be implemented with the control unit 508, the controller interface 514, the location unit 506, the location interface 516, the communication unit 510, the software 512, the storage unit 504, the storage interface 518, or a combination thereof. For example, the navigation system 700 can calculate the dynamic rank 740 using the control unit 508 to retrieve the current location 210 from the location unit 506 to calculate the nearness 748 and the route accessibility 750

The total rank module 710 can be implemented with the first device 102. The total rank module 710 can be implemented with the control unit 508, the controller interface 514, the communication unit 510, the software 512, the storage unit 504, the storage interface 518, or a combination thereof. For example, the navigation system 700 can calculate the total rank 760 using the control unit 508 and the storage unit 504.

The navigation module 712 can be implemented with the first device 102. The navigation module 712 can be implemented with the control unit 508, the controller interface 514, the software 512, the location unit 506, the location interface 516, the display interface 202, the user interface 502, or a combination thereof.

For example, the navigation system 700 can navigate the user to the first point of interest 214 using the control unit 508 to send the navigation routing information 772 to the user interface 502 for displaying on the display interface 202. The location unit 506 can determine the current location 210 to be used to update the display interface 202.

The navigation system 700 can be partitioned between the first device 602 of FIG. 6 and the second device 606 of FIG. 6. For example, the navigation system 700 can be partitioned into the functional units of the first device 602, the second device 606, or a combination thereof. The navigation system 700 can also be implemented as additional functional units in the first device 102 of FIG. 1, the first device 602, the second device 606, or a combination thereof.

The point of interest module 702 can be implemented with the navigation system 600 of FIG. 6 using the first device 602 of FIG. 6 and the second device 606 of FIG. 6. The point of interest module 702 can be implemented with the first user interface 618 of FIG. 6, the first display interface 630 of FIG. 6, the first control unit 612 of FIG. 6, the first storage unit 614 of FIG. 6, the first communication unit 616 of FIG. 6, or a combination thereof.

For example, the navigation system 600 can use the first control unit 612 to retrieve the name of an entry from the first storage unit 614 and retrieve the current location 210 from the second location unit 652 to generate the first point of interest 214. In another example, the navigation system 600 can use the first user interface 618 to enter a name for the first point of interest 214 and retrieve the current location 210 from the second location unit 652 to generate the first point of interest 214. The first point of interest 214 can be generated by linking a name and a location.

The keyword module 704 can be implemented with the navigation system 600 using the first device 602 and the second device 606. The keyword module 704 can be implemented with the first user interface 618, the second user interface 638, the first control unit 612, the second control unit 634, the first communication unit 616, the second communication unit 636, the first software 626, the second software 642, the first storage unit 614, the second storage unit 646, or a combination thereof.

For example, the navigation system 700 can use the user interface 502, the control unit 508, and the storage unit 504 to associate the keyword 724 with the first point of interest 214. The first control unit 612 can use the first user interface 618 to select the keyword 724 from the keyword list 728 retrieved from the second storage unit 646.

The static rank module 706 can be implemented with the navigation system 600 using the first device 602 and the second device 606. The static rank module 706 can be implemented with the first user interface 618, the second user interface 638, the first control unit 612, the second control unit 634, the first communication unit 616, the second communication unit 636, the first software 626, the second software 642, the first storage unit 614, the second storage unit 646, or a combination thereof. For example, the navigation system 600 can calculate the static rank 730 by using the first control unit 612 to retrieve static ranking component information from the first storage unit 614.

The dynamic rank module 708 can be implemented with the navigation system 600 using the first device 602 and the second device 606. The dynamic rank module 708 can be implemented with the first user interface 618, the second user interface 638, the first control unit 612, the second control unit 634, the first communication unit 616, the second communication unit 636, the first location unit 620, the second location unit 652, the first software 626, the second software 642, the first storage unit 614, the second storage unit 646, or a combination thereof.

For example, the navigation system 600 can calculate the dynamic rank 740 using the first control unit 612 to retrieve the current location 210 from the first location unit 620. The first control unit 612 can communicate using the first communication unit 616 and the second communication unit 636 to retrieve the current location 210 from the second location unit 652.

The total rank module 710 can be implemented with the first device 102. The total rank module 710 can be implemented with the control unit 508, the controller interface 514, the communication unit 510, the software 512, the storage unit 504, the storage interface 518, or a combination thereof. For example, the navigation system 700 can calculate the total rank 760 using the control unit 508 and the storage unit 504.

The total rank module 710 can be implemented with the navigation system 600 using the first device 602 and the second device 606. The total rank module 710 can be implemented with the first user interface 618, the second user interface 638, the first control unit 612, the second control unit 634, the first communication unit 616, the second communication unit 636, the first software 626, the second software 642, the first storage unit 614, the second storage unit 646, or a combination thereof.

The navigation module 712 can be implemented with the navigation system 600 using the first device 602 and the second device 606. The navigation module 712 can be implemented with the first user interface 618, the second user interface 638, the first control unit 612, the second control unit 634, the first communication unit 616, the second communication unit 636, the first location unit 620, the second location unit 652, the first software 626, the second software 642, the first storage unit 614, the second storage unit 646, or a combination thereof.

For example, the navigation system 600 can navigate the user to the first point of interest 214 using the first control unit 612 to send the navigation routing information 772 to the first user interface 618 for displaying on the first display interface 630. The first location unit 620 can determine the current location 210 to be used to update the first display interface 630.

It has further been discovered that the present invention provides the navigation system 700 with point of interest ranking with increased reliability and reduced costs. The navigation system 700 can calculate the dynamic rank 740 of the keyword 724 for the first point of interest 214 using the current location 210, the current time 744, and the current date 746 to reduce the chances of selecting the first point of interest 214 that cannot be reached at a valid time. Costs can be reduced by avoiding the selection and navigation to target locations that are not operating, resulting in wasted trips. In addition, using the dynamic rank 740 and the static rank 730 as combined in the total rank 760 to identify the candidate points of interest 302 increases the reliability of selecting a good destination by insuring that the candidate points of interest 302 are displayed on the display interface 202 for selection by the user.

The physical transformation of navigating from the current location 210 of the navigation system 700 to the first point of interest 214 can result in movement in the physical world, such as people or vehicles using the first device 102 of FIG. 1, based on the operation of the navigation system 700 to navigate to the first point of interest 214. As the movement in the physical world occurs, the movement itself and the change in the current location 210 creates additional information that can be converted back to assist in updating the dynamic rank 740 of the keyword 724 of the first point of interest 214. This supports the continued operation of the navigation system 700 with point of interest ranking to continue the movement in the physical world as the current location 210 changes.

The navigation system 700 describes the module functions or order as an example. The modules can be partitioned differently. For example, the dynamic rank module 708 can be performed by executing the software 512 of FIG. 5 with the control unit 508 of FIG. 5 in a single device configuration or by executing the first software 626 of FIG. 6 with the first control unit 612 of FIG. 6 and executing the second software 642 of FIG. 6 on the second control unit 634 of FIG. 6 in a two device configuration. Each of the modules can operate individually and independently of the other modules.

Figure 8:
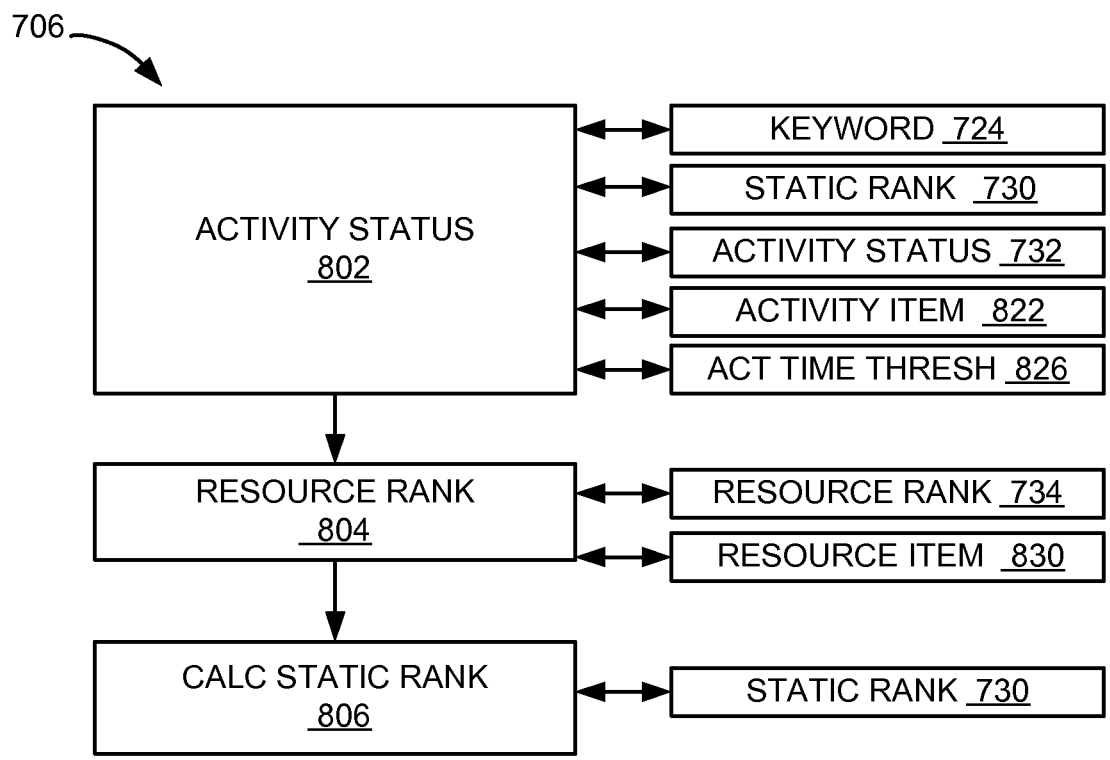
FIG. 8 is a detailed diagram of the static rank module of FIG. 7.

Referring now to FIG. 8, therein is shown a detailed diagram of the static rank module 706 of FIG. 7. The static rank module 706 can calculate the static rank 730 of the keyword 724 for the first point of interest 214 by combining the static ranking components 780 including the activity status 732 and the resource rank 734. Each static ranking component represents part of the static rank 730. The static rank module 706 can include an activity status module 802, a resource rank module 804, and a calculate static rank module 806.

The static rank module 706 can calculate the activity status 732 in the activity status module 802. The activity status 732 can indicate the desirability of the first point of interest 214 based on the occurrence of activities at the first point of interest 214. After the activity status 732 has been calculated, the control flow can pass to the resource rank module 804

The activity status 732 is a static ranking component of the static rank 730 based on the activities that are associated with the keyword 724 for the first point of interest 214. Each activity that took place at the first point of interest 214 is represented by an activity item 822. The activity item 822 represents the name of the activity, the activity description, the number of time the activity has occurred at the first point of interest 214, how frequently the activity occurs, or any combination thereof. The activity item 822 can be imported into the navigation system 700 from the external data source 720. The activity item 822 can be associated with the first point of interest 214 and can include meetings, events, conferences, parties, celebrations, sales promotions, concerts, openings, or any combination thereof.

The activity status 732 can be calculated by matching the activity item 822 with the first point of interest 214 and adding together the number of the activity item 822 with the same activity name to get a count of the times the activity item 822 occurred at the first point of interest 214. The activity status 732 can also be calculated by matching the activity item 822 with the first point of interest 214, the current date 746, and an activity time threshold 826 to limit the matching to those activities occurring within the activity time threshold 826.

For example, the external data source 720 can include information that a grand opening and two concerts were held at the first point of interest 214 within the last 60 days. The activity status 732 for the keyword 724 of "entertainment" can be calculated by correlating the activity item 822 for each of the activities within the activity time threshold 826 of "60 days" and adding up the number of correlations. In this case, the activity status 732 is 3.

The static rank module 706 can calculate the resource rank 734 in the resource rank module 804. The resource rank 734 can indicate the desirability of the first point of interest 214 based on the level of availability of a particular resource at the first point of interest 214. After the resource rank 734 has been calculated, the control flow can pass to the calculate static rank module 806.

The resource rank 734 is a static ranking component of the static rank 730 based on the availability of a resource item 830 at the first point of interest 214. The resource item 830 can be imported into the navigation system 700 from the external data source 720. The resource item 830 can be associated with the keyword 724 of the first point of interest 214. The resource item 830 can include items such as diesel fuel, gasoline grades, food, drinks, handicapped facilities, conference facilities, or any combination thereof.

The resource rank 734 can be calculated by matching the resource item 830 associated with the keyword 724 at the first point of interest 214 and increasing the count of the resource rank 734 if the resource is available or decreasing the count of the resource rank 734 if the resource is not available. Matching the resource item 830 includes the first point of interest 214 as a location. For example, if the resource item 830 is available at the first point of interest 214, then the resource rank 734 can be set to "100". If the resource item 830 is not available at the first point of interest 214, then the resource rank 734 can be set to "0".

The static rank module 706 can calculate the static rank 730 in the calculate static rank module 806. The static rank module 706 can calculate the static rank 730 in a variety of ways. For example, the static rank 730 can be calculated by adding the value of the activity status 732 with the value of the resource rank 734. In a further example, the static rank 730 can be calculated as a vector value with multiple individual values including the activity status 732 and the resource rank 734. After the static rank 730 has been calculated, the static rank module 706 has completed and the control flow can pass to the dynamic rank module 708 of FIG. 7.

The static rank 730 can be calculated by combining the static ranking components 780 represented by the activity status 732 and the resource rank 734. The static rank 730 can be calculated in a variety of methods. For example, the static rank 730 can be calculated by adding the activity status 732 and the resource rank 734 together and assigning the sum to be the static rank 730. In another example, the static rank 730 can also be calculated by multiplying the activity status 732 by the resource rank 734. Once the static rank 730 has been calculated, the static rank 730 can be updated by storing the static rank 730 in a memory including the storage unit 504 of FIG. 5, the first storage unit 614 of FIG. 6, the second storage unit 646 of FIG. 6, distributed between the first storage unit 614 and the second storage unit 646, a local storage, a remote storage, a database, a cache memory, or any combination thereof.

Figure 9:
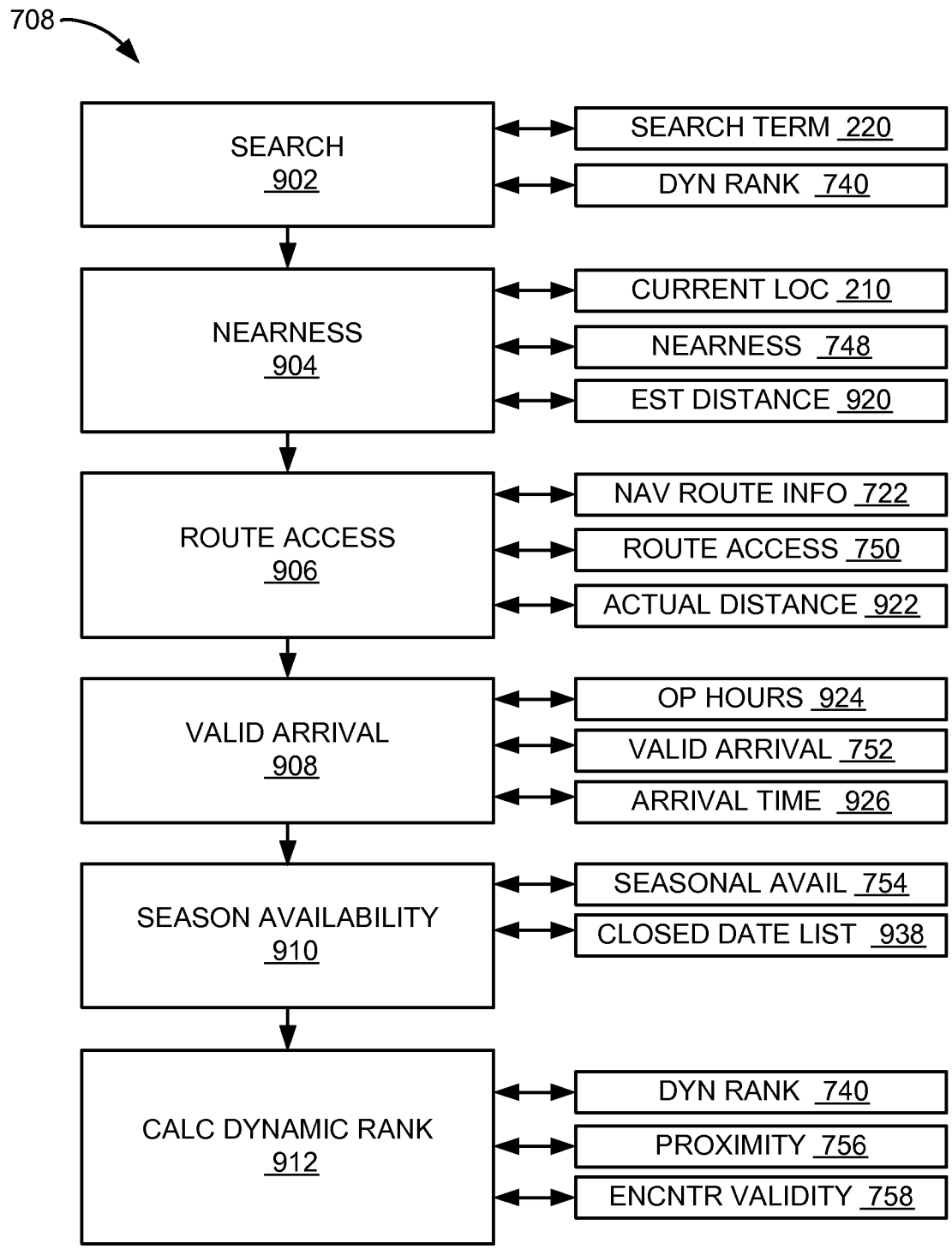
FIG. 9 is a detailed diagram of the dynamic rank module of FIG. 7.

Referring now to FIG. 9, therein is shown a detailed diagram of the dynamic rank module 708 of FIG. 7. The dynamic rank module 708 can receive the search term 220 and calculate the dynamic rank 740 for the keyword 724 of the first point of interest 214 by determining and combining the dynamic ranking components 782. The dynamic ranking components 782 can include the nearness 748, the route accessibility 750, the valid arrival 752, and the seasonal availability 754.

Each dynamic ranking component can represent an aspect of the dynamic rank 740 and can be determined by the current location 210, the current time 744, and the current date 746. The dynamic rank module 708 can include a search module 902, a nearness module 904, a route accessibility module 906, a valid arrival module 908, a seasonal availability module 910, and a calculate dynamic rank module 912.

The dynamic rank module 708 can search for the first point of interest 214 in the search module 902. The search module 902 can receive the search term 220 and search for the first point of interest 214 where the keyword 724 matches the search term 220. After the first point of interest 214 has been identified, the control flow can pass to the nearness module 904.

The search term 220 is a text value that is entered by the user and used as the basis for the search. Once the search term 220 has been received, the navigation system 700 can initiate the search for the candidate points of interest 302 of FIG. 3 that have been associated with the keyword 724.

The search term 220 can be received by the navigation system 700 by entering the text value in the user interface 502 or the first user interface 618 of FIG. 6. Once the search term 220 has been entered, the navigation system 700 can initiate the search for the first point of interest 214 that is associated with the keyword 724 that matches the search term 220.

The search module 902 can search for the first point of interest 214 by identifying the candidate points of interest 302 in the search area with the keyword 724 that matches the search term 220. For example, the keyword 724 and the search term 220 can be matched using a b-tree search, a binary search, a tree search, a linear search, or any combination thereof. Matching the keyword 724 and the search term 220 can include an exact match, a partial match, a wildcard match, a pattern match, or any combination thereof.

The search area can define the geographical area that encompasses the location associated with the current location 210. The size and shape of the search area can be defined in a variety of methods including manual definition by the user, the size and shape of the current map on the display interface 202, a fixed radius circle centered on the current location 210, or any combination thereof.

The candidate points of interest 302 can also be identified based on the static rank 730. For example, the candidate points of interest 302 can include the entry with highest value of the static rank 730. In another example, the candidate points of interest 302 can include the entries where the static rank 730 is above a selection threshold. In yet another example, the candidate points of interest 302 can include a fixed number of the entries with the highest value of the static rank 730.

The dynamic rank module 708 can calculate the nearness 748 in the nearness module 904. The nearness 748 can indicate the desirability of the first point of interest 214 based on an estimated distance 920 from the current location 210 to the first point of interest 214. After the nearness 748 has been calculated, the control flow can pass to the route accessibility module 906.

The nearness 748 represents the estimated distance 920 between the first point of interest 214 and the current location 210. The estimated distance 920 can be calculated along a straight line directly between the first point of interest 214 and the current location 210. The closer the first point of interest 214 is from the current location 210, the more desirable it is and the higher the ranking. The estimated distance 920 is estimated because it represents the physical straight line distance between the current location 210 and the first point of interest 214 and does not take into account variations in distance due to actual street routing and conditions.

The nearness 748 can be calculated by taking the reciprocal of the estimated distance 920 between the current location 210 and the first point of interest 214. The nearness 748 is larger when the estimated distance 920 is smaller. The nearness 748 can also be calculated by normalizing the value by comparing the estimated distance 920 for the first point of interest 214 with the distances between the other members of the candidate points of interest 302 and ranking them in ascending numerical order based on the estimated distance 920.

For example, in the situation where the first point of interest 214 is four miles away from the current location 210, then the nearness 748 can be calculated to be the reciprocal of four or "0.25". In another example, in the situation where the first point of interest 214 is ten miles away from the current location 210, then the nearness 748 can be calculated to be the reciprocal of ten or "0.10".

The dynamic rank module 708 can calculate the route accessibility 750 in the route accessibility module 906. The route accessibility 750 can indicate the desirability of the first point of interest 214 based on an actual distance 922 along the first proposed route 224 from the current location 210 to the first point of interest 214. After the route accessibility 750 has been calculated, the control flow can pass to the valid arrival module 908.

The route accessibility 750 is a dynamic ranking component that represents the actual distance along the first proposed route 224 from the current location 210 to the first point of interest 214. The smaller the actual distance to the first point of interest 214, the higher the ranking and the more desirable it is. The actual distance 922 represents the distance actually travelled along the streets of the first proposed route 224 from the current location 210 to the first point of interest 214.

The route accessibility 750 can be calculated by taking the reciprocal of the actual distance 922 between the current location 210 and the first point of interest 214 along the first proposed route 224. The route accessibility 750 is larger when the actual distance 922 is smaller. The route accessibility 750 can also be calculated by normalizing the value by comparing the actual distance for the first point of interest 214 with the distances of the other members of the candidate points of interest 302 and ranking them in ascending numerical order based on the actual distance 922.

The route accessibility 750 can include a single value representing actual distance, a normalized value comparing all the candidate points of interest 302, a vector value, or any combination thereof. The first proposed route 224 can be calculated by a variety of routing methods including least cost route, shortest route, time optimized, or any combination thereof.

For example, in the situation where the first proposed route 224 from the current location 210 to the first point of interest 214 is two miles long, the route accessibility 750 can be calculated to be "0.5". In another example, in the situation where the first proposed route 224 from the current location 210 to the first point of interest 214 is fifty miles, then the route accessibility 750 can be calculated to be "0.02".

The dynamic rank module 708 can calculate the valid arrival 752 in the valid arrival module 908. The valid arrival 752 can indicate the desirability of the first point of interest 214 based on an arrival at the first point of interest 214 during the operating hours 924 for the first point of interest 214. After the route accessibility 750 has been calculated, the control flow can pass to the valid arrival module 908.

The valid arrival 752 is a dynamic ranking component based on an arrival time 926 at the first point of interest 214 during the operating hours 924 of the first point of interest 214 based on distance between the current location 210 and the first point of interest 214. The valid arrival 752 indicates a high desirability when the arrival time 926 is within the operating hours 924. The valid arrival 752 indicates a low desirability when the arrival time 926 is outside of the operating hours 924.

The arrival time 926 can indicate the time when the navigation system 700 will arrive at the first point of interest 214. The arrival time 926 can be based on the current time 744 and the time required to navigate from the current location 210 to the first point of interest 214. The arrival time 926 can be based on the nearness 748, the route accessibility 750, or a combination thereof.

The arrival time 926 can be calculated in a variety of methods. For example, the arrival time 926 can be calculated based on the estimated distance 920 to the first point of interest 214 and the current speed 742 of the first device 102. The arrival time 926 can be calculated by dividing the estimated distance 920 by the current speed 742 and adding the result to the current time 744. The current speed 742 can be adjusted to reflect an estimated speed over the estimated distance 920 or over the actual distance 922 along the first proposed route 224. The estimated speed can include variations in the current speed 742 based on speed limits, traffic, road conditions, or any combination thereof.

In another example, the arrival time 926 at the first point of interest 214 can be calculated based on the actual distance 922 along the first proposed route 224 from the current location 210 to the first point of interest 214 and the current speed 742 of the first device 102. The arrival time 926 can be calculated by dividing the actual distance 922 along the first proposed route 224 by the current speed 742 and adding the result to the current time 744. The arrival time 926 can be adjusted by compensating for effects such as the variation in speed, speed limits, daylight saving time, a buffer time threshold, time measurement error, variations in the current speed 742, or any combination thereof.

The valid arrival 752 can be calculated by comparing the operating hours 924 of the first point of interest 214 with the arrival time 926. If the arrival time 926 for the first point of interest 214 falls within the operating hours 924, then the valid arrival 752 can be ranked high, indicating a heightened desirability for the first point of interest 214. If the arrival time 926 falls outside the operating hours 924, indicating that the first point of interest 214 is not open at the arrival time 926, then the valid arrival 752 can be ranked low, indicating a low desirability for the first point of interest.

The dynamic rank module 708 can calculate the seasonal availability 754 in the seasonal availability module 910. The seasonal availability 754 can indicate the desirability of the first point of interest 214 based on whether the first point of interest 214 is open on the current date 746 or date of estimated arrival. After the seasonal availability 754 has been calculated, the control flow can pass to the calculate dynamic rank module 912.

The seasonal availability 754 is a dynamic ranking component based on known dates when the first point of interest 214 is not open or available. The seasonal availability 754 can reflect factors that affect the desirability of the first point of interest 214 such as winter closure, summer closure, climate effects, or any combination thereof. Each period of closure can be represented by an entry on a closed date list 938 of the first point of interest 214.

For example, if the first point of interest 214 is closed on the current date 746, then the seasonal availability 754 can be ranked low indicating a low desirability for the first point of interest 214. If the first point of interest 214 is open on the current date 746, then the seasonal availability 754 can be ranked high, indicating a high desirability for the first point of interest 213.

The seasonal availability 754 can be calculated by comparing the current date 746 with the closed date list 938. If the current date 746 is within a date range where the first point of interest 214 is closed, then the seasonal availability 754 can be set to "0". If the current date is within a date range where the first point of interest 213 is open, then the seasonal availability 754 can be set to "1". The closed date list 938 can be imported from the external data source 720.

The dynamic rank module 708 can calculate the dynamic rank 740 in the calculate dynamic rank module 912. The calculate dynamic rank module 912 can calculate the dynamic rank 740 for the keyword 724 of the first point of interest 214 based on the proximity 756 and the encounter validity 758. After the dynamic rank 740 has been calculated, the control flow can pass to the total rank module 710 of FIG. 7.

The dynamic rank 740 can represent the desirability of the first point of interest 214 based on the dynamic ranking components 782 including the proximity 756 and the encounter validity 758. Once the dynamic rank 740 has been calculated, it can be updated by storing the dynamic rank 740 in a memory such as the storage unit 504 of FIG. 5, the first storage unit 614 of FIG. 6, the second storage unit 646 of FIG. 6, distributed between the first storage unit 614 and the second storage unit 646, a local storage, a remote storage, a database, a cache memory, or any combination thereof. The proximity 756 can represent the distance between the current location 210 and the first point of interest 214. The proximity 756 can be calculated using the estimated distance 920, the actual distance 922, or any combination thereof.

The encounter validity 758 represents whether the user can arrive at the first point of interest 214 at a valid time. The valid time can be determined by arriving within the operating hours 924 and within the open dates of the seasonal availability 754.

The encounter validity 758 can be calculated by combining the valid arrival 752 and the seasonal availability 754 where the arrival time 926 is within the operating hours 924 of the first point of interest 214. The encounter validity 758 can be calculated in a variety of methods including multiplying the valid arrival 752 by the seasonal availability 754, adding the valid arrival 752 to the seasonal availability 754, or any combination thereof. The encounter validity 758 can be calculated based on the arrival time 926 being within the operating hours 924 of the first point of interest 214 as represented by the valid arrival 752 and the current date 746 being outside the dates on the closed date list 938 as represented by the seasonal availability 754.

The dynamic rank 740 can be calculated by combining the proximity 756 and the encounter validity 758. The dynamic rank 740 can be calculated in a variety of methods. For example, the dynamic rank 740 can be calculated by adding the proximity 756 and the encounter validity 758, multiplying the proximity 756 by the encounter validity 758, or any combination thereof. Each of the dynamic ranking components 782 can be assigned an additional weighting factor to modify the calculation as needed.

In an example of calculating the dynamic rank 740, the navigation system 700 is searching for the keyword 724 "amusement park" at "8:00 PM" on Saturday evening in October. The current speed 742 is forty kilometers per hour. The first point of interest 214 is set to "CoasterWorld". The operating hours 924 indicate that the first point of interest 214 is open from "11:00 AM-11:00 PM" on Saturday and Sunday.

The dynamic rank module 708 can calculate the dynamic rank 740 by multiplying the proximity 756 by the encounter validity 758. The proximity 756 can be set to the route accessibility 750. The route accessibility 750 can be set to the actual distance 922 of sixty kilometers along the first proposed route 224 from the current location 210 to the first point of interest 214 and have a value of "60".

The encounter validity 758 can be calculated by multiplying the valid arrival 752 by the seasonal availability 754. The valid arrival 752 can be calculated by comparing the arrival time 926 with the operating hours 924. The arrival time 926 can be calculated by dividing the actual distance 922 of sixty kilometers by the current speed of forty miles per hour and adding the result to the current time 744 resulting in the arrival time 926 of "9:30 PM". Because the arrival time 926 of "9:30 PM" is within the operating hours of "11:00 AM-11:00 PM", the valid arrival 752 is set to "1".

The seasonal availability 754 can be calculating by comparing the current date 746 to the closed date list 938. Since the closed date list 938 indicates that the first point of interest 214 is closed the entire month of March, but open the rest of the year, the seasonal availability 754 is set to "1". The encounter validity 758 can be calculated as the result of the valid arrival 752 value of "1" multiplied by the seasonal availability 754 value of "1" for a result of "1".

Thus, the dynamic rank 740 can be calculated by multiplying the proximity 756 of sixty by the encounter validity of "1" resulting in the dynamic rank 740 of sixty.

Figure 10:
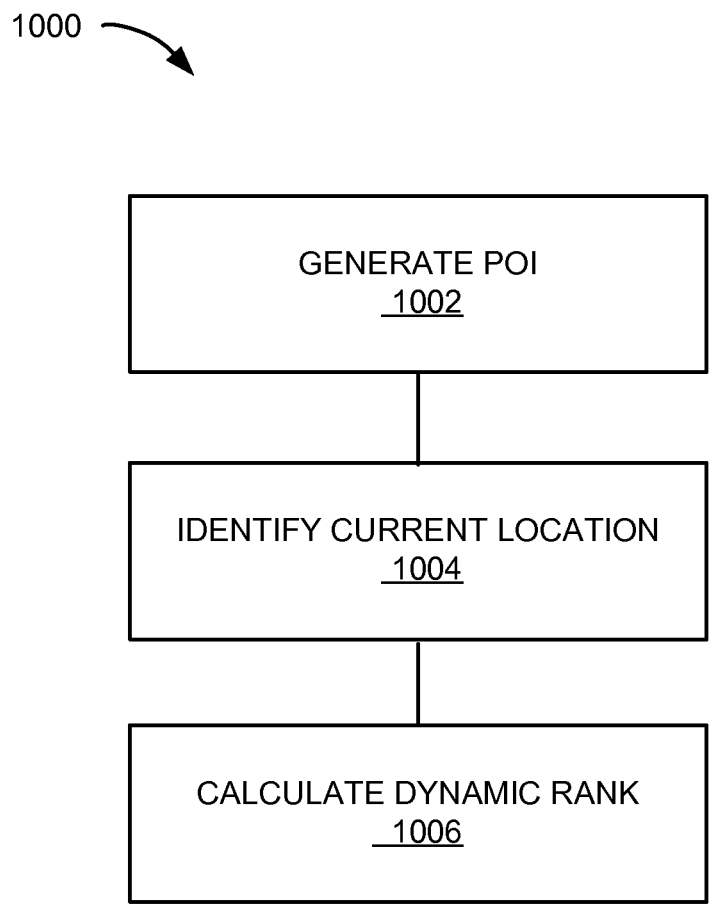
FIG. 10 is a flow chart of a method of operation of the navigation system with point of interest ranking mechanism in a further embodiment of the present invention.

Referring now to FIG. 10, therein is shown a flow chart of a method 1000 of operation of the navigation system 100 with point of interest ranking mechanism in a further embodiment of the present invention. The method 1000 includes: generating a first point of interest in a block 1002; identifying a current location for locating a device in a block 1004; and calculating a dynamic rank for the first point of interest, the dynamic rank represents a relevant match listing of the first point of interest based on a proximity of the current location to the first point of interest and an encounter validity based on the arrival time at the first point of interest in a block 1006.

The resulting method and system is straightforward, cost-effective, uncomplicated, highly versatile, sensitive, and accurate. The method can be implemented by adapting known components for ready, efficient, and economical manufacturing, application, and utilization.

Another important aspect of the present invention is that it valuably supports and services the historical trend of increasing accuracy, reducing costs, and increasing performance. These and other valuable aspects of the present invention consequently further the state of the technology to at least the next level.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating a first point of interest;
   identifying a current location by reading a location unit for locating a device;
   calculating a static rank for the first point of interest based on time-invariant factors;
   calculating a dynamic rank for the first point of interest, the dynamic rank represents a relevant match listing of the first point of interest based on a proximity of the current location to the first point of interest and an encounter validity based on the arrival time at the first point of interest; and
   calculating a total rank based on combining the static rank and the dynamic rank;
   displaying the first point of interest along a first proposed routed based on the total rank on the device.

2. The method as claimed in claim 1 further comprising:
   associating a keyword with the first point of interest; and
   wherein:
   calculating the dynamic rank includes calculating the dynamic rank for the keyword associated with the first point of interest.

3. The method as claimed in claim 1 further comprising:
   associating a keyword with the first point of interest; and
   wherein:
   calculating the static rank includes calculating the static rank for the keyword associated with the first point of interest, the static rank represents the desirability of the first point of interest based on the time-invariant factors.

4. The method as claimed in claim 1 further comprising:
   associating a keyword with the first point of interest;
   calculating an activity status for detecting an activity occurring at the first point of interest related to the keyword; and
   wherein:
   calculating the static rank includes calculating the static rank of the keyword associated with the first point of interest, the static rank represents the desirability of the first point of interest based on the activity status.

5. The method as claimed in claim 1 further comprising:
   associating a keyword with the first point of interest;
   calculating a resource rank for the keyword based on resource availability for the keyword at the first point of interest; and
   wherein:
   calculating the static rank includes calculating the static rank of the keyword associated with the first point of interest, the static rank represents the desirability of the first point of interest based on the resource rank.

6. A method of operation of a navigation system comprising:
   generating a first point of interest;
   identifying a current location by reading a location unit for locating a device;
   associating a keyword with the first point of interest;
   calculating a static rank for the first point of interest based on time-invariant factors;
   calculating a dynamic rank for the first point of interest, the dynamic rank represents a relevant match listing of the first point of interest based on a proximity of the current location to the first point of interest and an encounter validity based on the arrival time at the first point of interest; and
   calculating a total rank for the keyword associated with the first point of interest based on combining the static rank and the dynamic rank;
   displaying the first point of interest along a first proposed routed based on the total rank on the device.

7. The method as claimed in claim 6 wherein calculating the dynamic rank includes:
   calculating an estimated distance from the current location to the first point of interest; and
   calculating an arrival time to the first point of interest based on the estimated distance and a current speed for monitoring the device.

8. The method as claimed in claim 6 wherein calculating the dynamic rank includes:
calculating an actual distance from the current location to the first point of interest along a first proposed route; and
calculating an arrival time to the first point of interest based on the actual distance and a current speed for monitoring the device.

9. The method as claimed in claim 6 wherein calculating the dynamic rank includes calculating a proximity based on an actual distance between the current location and the first point of interest along a current route.

10. The method as claimed in claim 6 wherein:
calculating the static rank includes calculating the static rank for the keyword associated with first point of interest;
calculating the total rank includes calculating the total rank by combining the static rank and the dynamic rank for determining the first point of interest with a highest rating; and
further comprising:
selecting the first point of interest based on the total rank.

11. A navigation system comprising:
a control unit for generating a first point of interest;
a location unit, coupled to a control unit, for identifying a current location;
a static rank module, coupled to the control unit, for calculating a static rank for the first point of interest based on time-invariant factors;
a dynamic rank module, coupled to the control unit, for calculating a dynamic rank for the first point of interest, the dynamic rank represents a relevant match listing of the first point of interest based on a proximity of the current location to the first point of interest and an encounter validity based on the arrival time at the first point of interest; and
a total rank module, coupled to the control unit, for calculating a total rank based on combining the static rank and the dynamic rank for displaying the first point of interest on the device.

12. The system as claimed in claim 11 further comprising:
a keyword module, coupled to the control unit, for associating a keyword with the first point of interest; and
wherein:
the dynamic rank module is for calculating the dynamic rank for the keyword associated with the first point of interest.

13. The system as claimed in claim 11 further comprising:
a keyword module, coupled to the control unit, for associating a keyword with the first point of interest; and
wherein:
the static rank module includes a calculate static rank module, for calculating the static rank for the keyword associated with the first point of interest.

14. The system as claimed in claim 11 further comprising:
a keyword module, coupled to a control unit, for associating a keyword with the first point of interest;
an activity status module, coupled to the control unit, for calculating an activity status for actions occurring at the first point of interest related to the keyword; and
wherein:
the static rank module includes a calculate static rank module for calculating the static rank of the keyword associated with the first point of interest based on the activity status.

15. The system as claimed in claim 11 further comprising:
a keyword module, coupled to the control unit, for associating a keyword with the first point of interest;
a resource rank module, coupled to the control unit, for calculating a resource rank for the keyword based on a resource availability for the keyword at the first point of interest; and
a calculate static rank module, coupled to the keyword module, for calculating the static rank of the keyword associated with the first point of interest based on the resource rank.

16. The system as claimed in claim 11 further comprising:
a keyword module, coupled to the control unit, for associating a keyword with the first point of interest; and
wherein:
the total rank module is for calculating a total rank for the keyword associated with the first point of interest based on combining the static rank and the dynamic rank for displaying the first point of interest on the device.

17. The system as claimed in claim 16 wherein the dynamic rank module includes:
a nearness module, for calculating an estimated distance from the current location, to the first point of interest; and
a valid arrival module for calculating an arrival time to the first point of interest based on the estimated distance and a current speed for monitoring the device.

18. The system as claimed in claim 16 wherein the dynamic rank module includes:
a calculate dynamic rank module for calculating an actual distance from the current location to the first point of interest along a first proposed route; and
a valid arrival module for calculating an arrival time to the first point of interest based on the actual distance and a current speed for monitoring the device.

19. The system as claimed in claim 16 wherein the dynamic rank module includes a calculate dynamic rank module for calculating the proximity based on an actual distance between the current location and the first point of interest along a current route.

20. The system as claimed in claim 16 wherein:
the static rank module is for calculating the static rank for the keyword associated with first point of interest;
the total rank module is for calculating the total rank by combining the static rank and the dynamic rank for determining the first point of interest with a highest rating; and
further comprising:
a navigation module, coupled to the total rank module, for selecting the first point of interest based on the total rank.

* * * * *